United States Patent [19]
Dudley et al.

[11] Patent Number: 5,275,636
[45] Date of Patent: Jan. 4, 1994

[54] AIR CLEANER FOR INTERNAL COMBUSTION ENGINE

[75] Inventors: Lynn A. Dudley, Chino; John J. Hyatt, LaVerne; Kevin J. Myers, Pomona, all of Calif.

[73] Assignee: Vortox Company, Claremont, Calif.

[21] Appl. No.: 893,397

[22] Filed: Jun. 4, 1992

[51] Int. Cl.$^5$ ............... B01D 46/10; B01D 27/07
[52] U.S. Cl. ..................... 55/274; 55/385.3; 55/496; 55/502; 55/503; 55/507; 55/509; 55/DIG. 5
[58] Field of Search ............ 55/270, 274, 385.1, 55/385.3, 496–; 210/493.2

[56] References Cited

U.S. PATENT DOCUMENTS

| | | | |
|---|---|---|---|
| 2,881,860 | 4/1959 | Ternes | 55/385.3 X |
| 2,952,327 | 9/1960 | Farr | 55/385.3 X |
| 2,962,121 | 11/1960 | Wilber | 55/498 X |
| 3,147,100 | 9/1964 | Wilber | 55/497 X |
| 3,169,844 | 2/1965 | Young | 55/498 |
| 3,249,172 | 5/1966 | DeLorean | 55/502 X |
| 3,307,336 | 3/1967 | Dewsberry | 55/385.3 X |
| 3,357,163 | 12/1967 | Burger et al. | 55/385.3 |
| 3,641,746 | 2/1972 | Smith et al. | 55/385.3 |
| 3,870,495 | 3/1975 | Dixson et al. | 55/497 X |
| 3,934,992 | 1/1976 | Thompson | 55/385.3 X |
| 4,104,170 | 8/1978 | Nedza | 55/498 X |
| 4,350,509 | 9/1982 | Alseth et al. | 55/498 X |
| 4,365,980 | 12/1982 | Culbert et al. | 55/498 X |
| 4,488,889 | 12/1984 | McCarroll | 55/502 |
| 4,548,166 | 10/1985 | Gest | 55/385.3 X |
| 4,758,256 | 7/1988 | Machado | 55/498 |
| 4,764,191 | 8/1988 | Morelli | 55/498 X |
| 4,787,925 | 11/1988 | Ansite | 55/496 |
| 5,112,372 | 5/1992 | Boeckermann et al. | 55/502 X |
| 5,125,940 | 6/1992 | Stanhope et al. | 55/498 X |

*Primary Examiner*—Robert Spitzer
*Attorney, Agent, or Firm*—Boniard I. Brown

[57] ABSTRACT

A disposable intake air cleaner for internal combustion engines, particularly relatively large truck engines and the like. The air cleaner accommodates engine intake air ducts of different sizes as well as installation of the cleaner on a motor vehicle without precise alignment of the air cleaner with the engine intake air duct and without the use of a hump hose or other flexible air conduit between the air cleaner and a fixed engine intake duct. The air cleaner has a flexible air duct coupling integrally formed, by a unique method, with a sealing bond between the air cleaner housing and air filter. A reusable flexible boot connects the air cleaner inlet to an engine air intake passage in the vehicle hood when the cleaner is mounted in the engine compartment and the hood is closed.

18 Claims, 2 Drawing Sheets

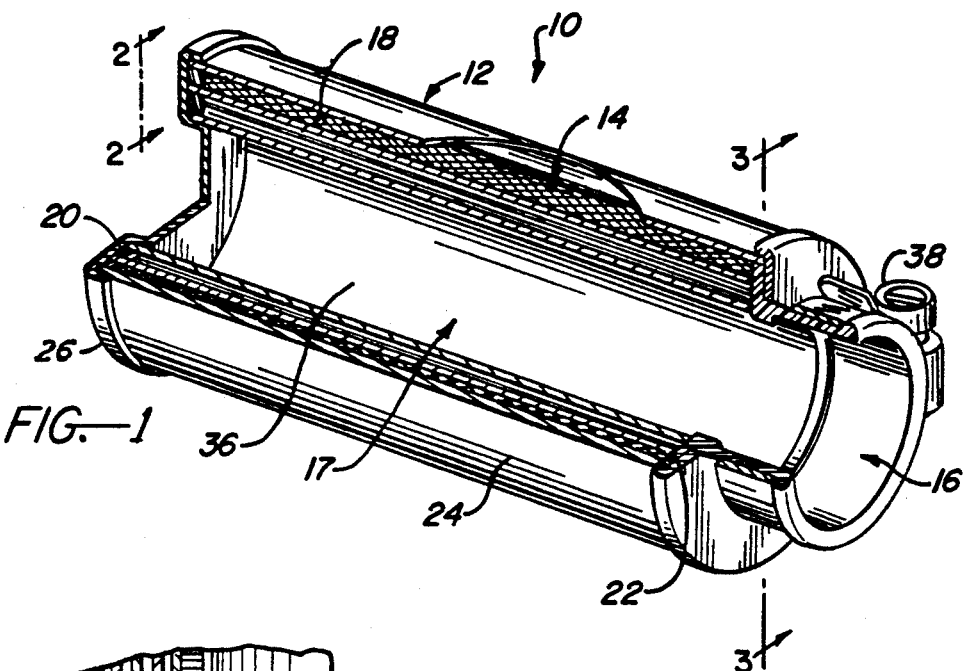
FIG.—1
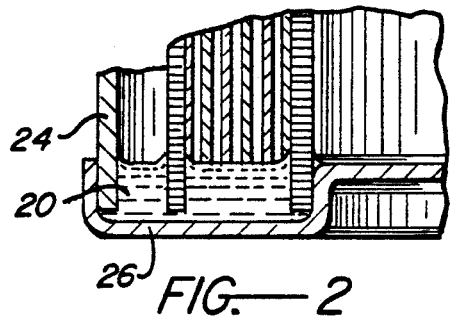
FIG.—2
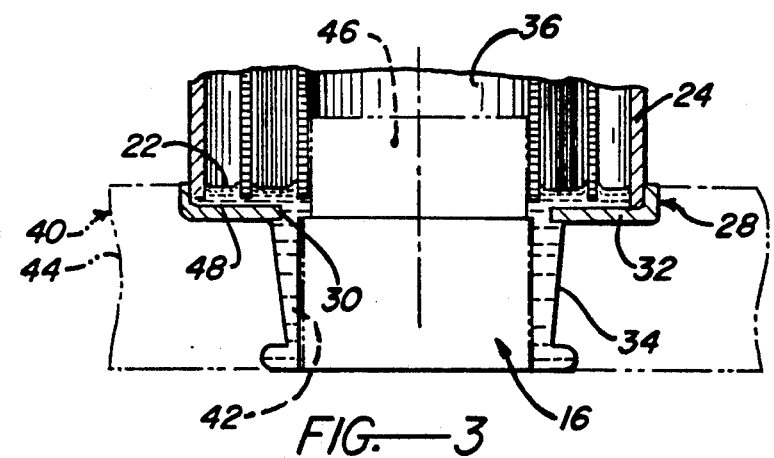
FIG.—3

AIR CLEANER FOR INTERNAL COMBUSTION ENGINE

BACKGROUND OF THE INVENTION

1. Field of the Invention

This invention relates generally to intake air cleaners for internal combustion engines and more particularly to an improved air cleaner for engine powered vehicles, especially trucks and other relatively large motor vehicles.

2. Prior Art

Engine powered vehicles have an intake air cleaner which filters the intake air to the engine before the air reaches the fuel input means, i.e. carburetor or fuel injectors. This air cleaner includes an air filter through which the intake air passes and which removes from the air entrained dust and other particulates that can clog carburetor and fuel injector fuel ports, cause excessive engine wear, and otherwise damage the engine.

Engine air cleaners, particularly those designed for use on trucks and other large vehicles, must satisfy several essential requirements. The foremost of these, of course, is highly effective air filtering capability down to the smallest particle size which the engine may ingest in use. Satisfaction of this requirement necessitates not only a highly effective air filter in the air cleaner but also effective sealing of the filter to the air cleaner housing so as to prevent leakage of unfiltered air past the filter.

Another air cleaner requirement is sufficiently high air through flow capacity to efficiently satisfy the engine air intake requirements when running at top engine speed, even after a period of engine operation at least equal to the contemplated useful life of the air cleaner filter. In the case of large vehicles, such as trucks and the like, whose engines require a relatively volumetric intake air flow rate, satisfaction of this requirement necessitates a relatively large air flow passage through the air cleaner and a relatively large surface area filter. As a consequence, air cleaners for such vehicles are quite large and generally mounted on the outside of the vehicle rather than within the engine compartment as in small trucks and passenger vehicles. Both mounting locations, that is outside of the vehicle and within the engine compartment, often present mounting problems, such as alignment of the air cleaner inlet and/or outlet with the engine intake air duct(s) and fitting the air cleaner within the available air cleaner mounting space.

Other considerations which are highly important to vehicle operators, particularly large truck operators who log relatively high mileage, are efficient engine operation, high fuel economy, and economical engine maintenance. Continued high engine efficiency and fuel economy require periodic replacement of the intake air filter since a dirty air filter significantly degrades engine efficiency and increases fuel consumption. In many vehicles, such as passenger vehicles, the engine air cleaner housing is permanently mounted within the engine compartment and contains a removable filter cartridge. Periodic filter replacement involves the simple task of removing a cover from the cleaner housing, replacing the dirty filter cartridge with a clean one, and replacing the cover on the housing. It is unnecessary to disconnect and reconnect any engine air ducts from and to the housing. In contrast, one of the most widely used air cleaners for trucks and other large vehicles are disposable units including a housing and a filter permanently mounted in the housing. Replacement of such an air cleaner involves disconnection of at least one engine air duct from the cleaner housing, removal of the entire air cleaner unit (housing and its contained dirty filter), replacement of the dirty unit by a clean unit (housing and its contained clean filter), and reconnection of the engine air duct(s) to the housing of the new unit.

This necessity of periodically disconnecting and reconnecting engine air duct(s) from and to the air cleaner and replacing the entire air cleaner unit including the cleaner housing and its contained air filter gives rise to two additional requirements which must be satisfied in order to provide a satisfactory truck engine air cleaner. These two requirements are maximum ease of air cleaner removal and replacement and low air cleaner replacement costs. Regarding the ease of air cleaner replacement, it is worthwhile to note that in most cases, at least the engine intake air duct(s) through which intake air flows to the engine is/are fixed and rigid. In many cases, it is difficult or impossible to precisely align the air cleaner housing with such fixed duct(s). For this reason, as well as to accommodate a size difference between the filter outlet and/or inlet and the engine air duct(s), it is necessary to utilize a flexible conduit or hose, such as a so-called hump hose, between most conventional air cleaners and the engine air duct(s). Such flexible air conduits or hoses complicate the filter installation and removal procedure, consume valuable air cleaner mounting space, and constitute additional parts which are subject to wear and periodic replacement. The air cleaner replacement cost is dependent primarily upon the purchase price of a new air cleaner. Accordingly, satisfying the vehicle operator's desire for low air cleaner replacement cost requires an air cleaner capable of manufacture at relatively low cost. The ability to use a given air cleaner on engines having different intake air duct sizes aids in reducing air cleaner manufacturing cost by reducing the number of sizes which must be manufactured and inventoried. Filter replacement inventories and costs are reduced, providing definite marketing advantage.

The prior art is replete with a vast assortment of engine air cleaners of the class described. Among the patents disclosing such air cleaners are the following: U.S. Pat. Nos. 4,350,509, 4,365,980, and 4,488,889.

SUMMARY OF THE INVENTION

This invention provides an improved engine air cleaner of the class described which uniquely satisfies the above noted and other air cleaner requirements. Simply stated, the improved air cleaner comprises an outer sealed housing having air inlet means and air outlet means, at least the larger of which constitutes a connecting means for connecting the air cleaner to an engine intake air duct, an inner filter within the housing through which air flow occurs from the inlet means to the outlet means, and a number of improvement features which uniquely adapt the air cleaner to its primary intended purpose as an intake air cleaner for relatively large vehicles such as trucks and the like.

One improvement feature of the air cleaner resides in its adaptability for connection to engine air dusts of different sizes. The engine air duct to which the air cleaner outlet means is connected may be the air intake of the engine itself or the air intake of a supercharger. According to this feature, at least the outlet means of the air cleaner (and also the inlet means if it is to be connected to an intake air duct) is sized for connection to an engine air duct of a certain size, and the air cleaner includes at least one adaptor which may be removably secured to the air cleaner outlet means to permit connection of the air cleaner to an engine air duct of another size. In the presently preferred air cleaner embodiments hereinafter described, the cleaner outlet comprises a sleeve-like coupling for receiving an engine air duct of a certain size. The outlet adaptor is an annular reducer which is insertable into the outlet coupling to reduce its effective inside diameter and thereby adapt the coupling to receive an engine air duct of a smaller size. Adaptors may be made in a range of inside diameters to accommodate the basic air cleaner structure to a relatively large range of engine air duct sizes.

According to another improvement feature of the invention, the outlet coupling and outlet adaptor of the air cleaner are made resiliently flexible or yieldable in order to eliminate the need to use a flexible connecting conduit of the kind mentioned earlier between the air cleaner outlet and the engine intake air duct, as required with many of the existing engine air cleaners mentioned earlier. This feature simplifies the air cleaner replacement procedure, conserves often much needed air cleaner mounting space, and eliminates the need to periodically replace the flexible connecting conduit.

Yet another improvement feature of the invention is concerned with a method of sealing the air cleaner to the interior of the air cleaner housing to prevent leakage of unfiltered air between the filter and housing and simultaneously forming the air cleaner outlet coupling. According to this feature, the coupling and filter bond are formed by (a) placing the air cleaner housing in position wherein the interior space of the housing within which the filter is to be bonded to the housing is situated at the bottom of the housing, (b) placing a coupling mold in contact with the underside of the housing in a position corresponding to the position of the outlet coupling on the housing of the finished air cleaner and with the mold cavity in the mold opening upwardly to the interior housing filter bonding space, (c) introducing a composite molding/bonding compound into the bottom of the housing in such a way that the compound fills the mold cavity and the bottom of the housing to a level slightly above the portion of the filter to be bonded to the housing, and (c) allowing the compound to set and thereby form both a bond between the filter and the housing and an outlet coupling portion integrally joined to the filter bonding portion.

In the preferred air cleaner described herein, the housing is cylindrical and has an opening in one end peripherally surrounded by an annular flange extending inwardly from the housing side wall. The inner air filter is cylindrical in shape and concentrically positioned within the shell with one end situated close to or in contact with the flange. The coupling mold used in the method of the invention is placed in contact with this flange about the coupling mold cavity, and the bonding compound is introduced into the shell while the shell and mold are upright with the flanged shell end and mold lowermost so that the compound fills the mold cavity and the lower end of the shell to a level just above the lower end of the filter. When set, the bonding compound bonds the adjacent end of the filter to the shell, forms the housing outlet coupling, and seals the coupling to the housing about the housing opening. The preferred bonding compound is PLASTISOL which is economical to use and is flexible when set.

A further improvement feature of the invention provides an air cleaner which is uniquely adapted for installation within the engine compartment of a vehicle, such as a truck, having a hood containing an engine air intake passage having a front end which opens forwardly through the front end of the hood and a rear end which opens downwardly into the engine compartment through a discharge opening in the underside of the hood. According to this feature, the air cleaner housing is mounted within the engine compartment with its air inlet aligned with the opening upwardly toward the rear end opening upwardly toward the discharge opening in the hood. A resilient boot, secured in a unique way to the air cleaner housing inlet, seats against the underside of the hood about the discharge opening when the hood is closed to conduct intake air from the hood intake passage to the air cleaner. The boot is freely separable from the hood to permit the hood to be opened without restriction.

According to yet another improvement feature of the invention, the air cleaner housing is equipped with a fitting for releasable connection to an air pressure gauge. This novel location of the fitting on the closed end cap permits the pressure level within the air cleaner to be measured during engine operation for the purpose of determining the cleanliness of the air cleaner filter and permits removal of the gauge for disposal of the air cleaner when dirty.

BRIEF DESCRIPTION OF THE DRAWINGS

FIG. 1 is a perspective view, partly broken away, of an improved engine air cleaner according to this invention;

FIG. 2 is an enlarged view looking in the direction of the arrows on line 2—2 in FIG. 1;

FIG. 3 is an enlarged section taken on line 3—3 in FIG. 1;

DESCRIPTION OF THE PREFERRED EMBODIMENTS

Figure 4:
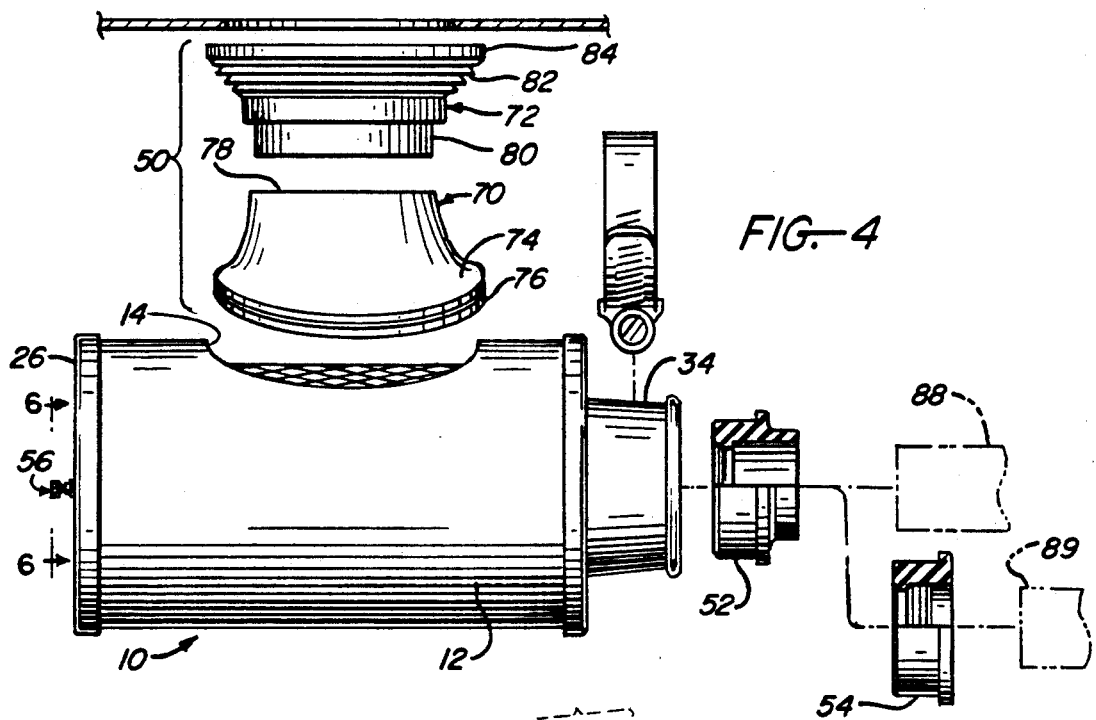
FIG. 4 is an exploded view in side elevation of an air cleaner modification of the invention including the air cleaner of FIGS. 1-3.

Turning now to these drawings and first to FIGS. 1-3 thereof, there is illustrated an improved engine air cleaner 10 according to the invention. This air cleaner includes a housing 12 having air inlet means 14 and air outlet means 16, an air passage 17 communicating and opening to the exterior of the housing through the inlet means and outlet means, and an air filter 18 within the passage 17 through which air flow occurs from the inlet means to the outlet means. Portions of the filter are bonded and thereby sealed to the inside of the housing at two locations 20 and 22 in such a way as to prevent leakage of unfiltered air around the filter. The air filter 18 is constructed of any one of the well known filter materials capable of removing dust and other particulates entrained in the air passing through the filter down to the smallest particle size for which the air cleaner is rated.

In the particular air cleaner illustrated, the housing 12 comprises a cylindrical shell 24 closed at one end by an end cap 26 fixed and sealed in any suitable way to the shell. About midway between the ends of this shell is a relatively large air inlet opening which constitutes the air cleaner inlet means 14. Fixed and sealed to the opposite end of the shell 24 is an annular end member 28. This end member contains a central opening 30 bounded about its periphery by an annular flange 32 extending radially inward from the adjacent end of the housing shell 24. Extending from the end member 28, through its opening 30 is a sleeve-like portion 34 which constitutes an outlet coupling and forms part of the air cleaner outlet means 16.

The air filter 18 is conventional and comprises a cylindrical sleeve-like filter structure consisting of several concentric filter and support layers. This filter structure is concentrically disposed within the housing 12 with the ends of the filter structure located close to the housing end cap 26 and end member flange 32 within the filter bonding locations 20, 22, respectively. Extending through the center of the filter is an air passage 36 which forms part of the air passage 17 and opens at one end to the passage through the outlet coupling 34. The air cleaner inlet 14 opens to the interior of the housing 12 about the outside of the filter 18. From this description, it is evident that air entering the air cleaner through its inlet 14 flows radially in through the filter to its central air passage 36 and then axially through this passage to the outlet coupling 34.

The ends of the filter 18 are sealed to the inside of the housing 12 at the locations 20, 22 by placing the air cleaner in a vertical position with one end of the housing lowermost, introducing a bonding compound into the housing to fill the lower housing end to a level just slightly above the adjacent end of the filter 18, allowing the bonding compound to set, and then turning the air cleaner over end for end and repeating the process to bond and seal the other end of the filter to the housing. While this method of sealing the filter to the housing is not broadly new, the preferred practice of the invention utilizes PLASTISOL as the bonding compound which is believed to be new. Also, according to an important feature of the invention which is also believed to be new, the outlet coupling 34 and the bond/seal between the filter and the housing are integrally formed simultaneously in the manner explained below. PLASTISOL is a relatively low cost thermoplastic compound which sets to a solid, resiliently yieldable or flexible form. The PLASTISOL is introduced into one end of the air cleaner housing, as explained above, in a molten state and then allowed to cool and set before the air cleaner is turned over to bond and seal the other end of the filter to the housing.

In use, the air cleaner 10 is mounted on an engine powered vehicle (not shown) either within or outside the vehicle engine compartment. The air cleaner outlet means 16 is coupled to the engine air intake duct (not shown) by inserting the duct into the outlet coupling 34 and securing the coupling to the duct by a hose clamp 38 or the like. During engine operation, the engine intake air enters the air cleaner through its side inlet 14, flows radially inward through the air filter 18 to its central air passage 36 and then axially through this passage to the engine air intake duct. As mentioned earlier, this engine air intake duct may be the engine air intake itself or the intake of a turbocharger or the like. It should also be mentioned here that in some engine installations, both the inlet means 14 and outlet means 16 may be connected to two adjacent sections of an engine intake air duct. In this case, the inlet means 14 may include a duct coupling.

As mentioned earlier, one improvement feature of the invention resides in making the air cleaner outlet coupling 34 flexible in order to facilitate installation of the air cleaner on a vehicle without the need to precisely align the cleaner outlet 16 relative to the engine air intake duct and without the use of a flexible connecting air conduit or the like between the intake duct and air cleaner. To this end, the outlet coupling is preferably made of the same material, i.e. PLASTISOL, as used to bond the ends of the filter 18 to the inside of the housing 12. According to the preferred practice of the invention, the coupling is formed integrally and simultaneously with the filter bond in the manner explained below.

According to the preferred practice just referred to, a coupling mold 40 is provided having a coupling mold cavity 42 conforming to the shape of the air cleaner outlet coupling 34. The mold 40 comprises a mold plate 44 containing an opening whose wall forms the annular outer wall of the mold cavity 42 and a core 46 which is positioned within the mold plate opening and whose outer surface forms the inner annular wall of the mold cavity. The air cleaner 10 is placed in a vertical position with its housing open end more 28 lowermost and seating on the mold plate 44 concentrically about the mold plate opening and with the mold core 46 concentrically disposed within the mold plate opening, as shown in FIG. 3, so that the opening 30 in the end member opens downwardly to the mold cavity 42. A composite bonding/molding compound capable of both bonding and sealing the filter 18 to the housing 12 and forming a molded outlet coupling 34 with the desired properties is then introduced into the housing to fill the mold cavity 42 and the lower end of the housing to a level just slightly above the lower end of the filter, as shown in FIG. 3. The compound is then allowed to set to form within the housing a filter bonding portion 48 which bonds and seals the filter 18 to the housing 12 and the outlet coupling portion 34 which is integral with the filter bonding portion 48 and extends therefrom to the exterior of the housing through its end opening 30. The filter bonding portion 48 provides a seal between the housing and the outlet coupling about the latter and the opening 30. As mentioned above, the preferred composite bonding/molding compound is PLASTISOL which is introduced into the housing and mold cavity in a molten state and then allowed to heat cure to form a flexible or yieldable coupling. Being yieldable, the molded coupling can be removed from the mold cavity, aided, if necessary by making the mold of a flexible material.

As mentioned above, the air cleaner is coupled to an engine air intake conduit or duct (not shown) by inserting the duct into the outlet coupling 34. Being yieldable, this coupling will accept a small range of different sized engine air ducts. According to another improvement feature of the invention, the air cleaner may be provided with one or more adaptors, described below in connection with FIGS. 4–7, for effectively adjusting the size of the air cleaner outlet 34 to accommodate a relatively large range of intake duct sizes.

Figure 5:
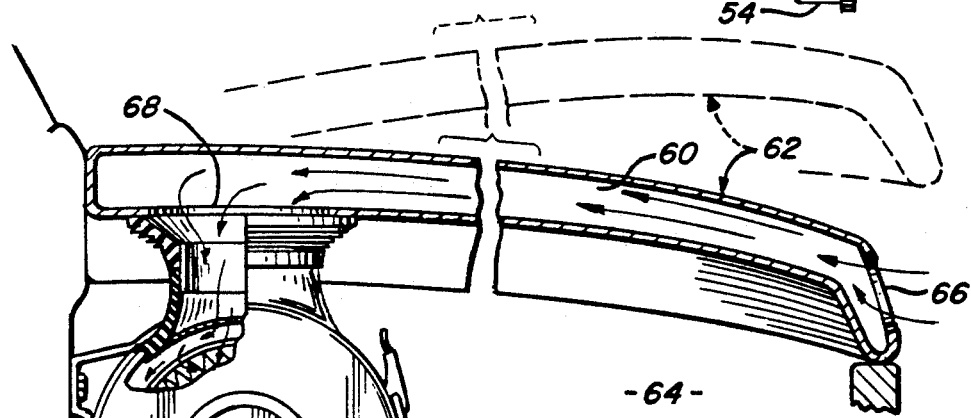
FIG. 5 is a view, partly in section, illustrating the air cleaner modification of FIG. 4 installed within the engine compartment of a motor vehicle.
Figure 6:
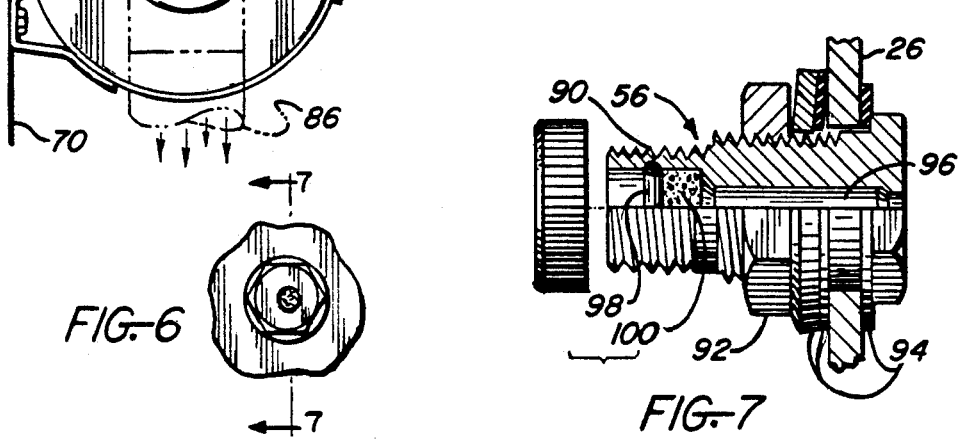
FIG. 6 is a view looking in the direction of the arrows on line 6—6 in FIG. 5.
Figure 7:
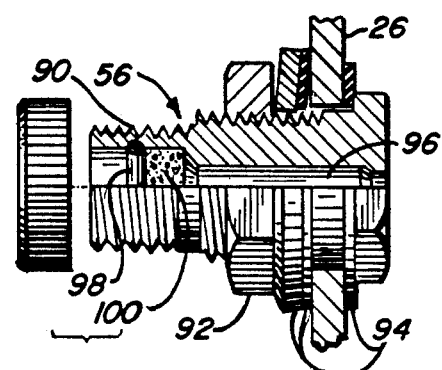
FIG. 7 is an enlarged section taken on line 7—7 in FIG. 6.

Turning now to FIGS. 4–7, there are illustrated an air cleaner 10 identical to that of FIGS. 1–3, an inlet boot 50 which adapts the air cleaner for use in the engine arrangement of FIG. 5, outlet adaptors 52, 54 which adapt the air cleaner for connection to engine air intake ducts 56, 58 of different sizes, and a fitting 55 which can receive a gauge for determining the cleanliness of the cleaner filter 18. The engine arrangement of FIG. 5 includes an engine air intake duct or passage 60 within the hood 62 of the vehicle engine compartment 64. The front end of this intake passage opens forwardly through an air entrance hole or holes 66 along the front edge of the hood. The rear end of the intake passage opens downwardly into the engine compartment 64 through an air discharge opening 68 in the underside of the hood. The air cleaner 10 is mounted on the engine compartment firewall 70 in a position wherein the side inlet 14 of the air cleaner is uppermost and is located directly below and vertically aligned with the air discharge opening 68 when the hood 62 is closed.

The inlet boot 50 is secured and sealed to the edge of the air cleaner inlet 14 in the manner explained below and is constructed and arranged to seat against the under surface of the hood 62 about its intake air discharge opening 68, in sealing relation to the hood surface, when the hood is closed. The boot then conducts incoming engine intake air from the hood intake passage 60 to the air cleaner 10. The boot 50 is made of rubber or other suitable flexible material and in two parts 70 and 72. The inner boot part 70 has a somewhat conical shape and includes a somewhat saddle-shaped base portion 74 of circular outline when viewed along the axis of the boot. This base portion has a peripheral groove 76 and is sized and shaped to fit closely within the air cleaner inlet opening 14 with the edge of this opening engaging in the groove 76 to secure and seal the boot part 70 to the air cleaner housing. The inner boot part 70 tapers generally conically from its base portion 74 to a smaller diameter outer end 78. The outer boot part 72 has a generally inverted conical shape and includes an inner cylindrical portion 80 which is sized to fit closely within the outer end 78 of the inner boot part 70. Outwardly of the cylindrical portion 80 is an accordion pleated portion 82 having an inverted conical taper and terminating in an outer circular rim 84 whose outer surface is flat and disposed in a plane transverse to the longitudinal axis of the inlet boot 50.

The air cleaner 10 is mounted on the firewall 70 in a position such that when the hood 62 is closed, the outer rim 84 of the inlet boot 50 seats against the underside of the hood about its intake air discharge opening 68, and the accordion pleated portion 82 of the boot is axially compressed a certain amount to retain the rim 84 in firm sealing contact with the hood. The boot thus serves to conduct engine intake air from the hood intake air passage 60 to the air cleaner 10. The air cleaner outlet coupling is connected to the engine intake air duct 86.

The illustrated outlet adaptors 52, 54 are annular reducers which are externally sized to fit closely within the air cleaner outlet coupling 34 and whose central openings have different sizes for receiving engine intake air ducts 88, 89 of different diameters. These adaptors or reducers are preferably made of rubber or other resiliently yieldable material. The illustrated air cleaner is thus capable of connection to engine intake ducts of three different sizes, namely a relatively large duct 86 which is inserted directly into the air cleaner outlet coupling 34, a smaller intake duct 88 which is inserted into the reducer 52 when positioned in the outlet coupling, and a still smaller intake duct 89 which is inserted into the reducer 54 when positioned in the outlet coupling.

The gauge fitting 56 is concentrically mounted on the housing end cap 26. This fitting includes an externally threaded, longitudinally apertured bolt 90 which extends through a hole in the center of the end cap 90 and mounts a nut 92 at the outer side of the end cap for firmly securing the bolt to the end cap. The bolt is sealed to the end cap by annular sealing washers 94 disposed between the end cap and the bolt head and between the end cap and the nut 92. Held within the longitudinal bolt passage 96 by a snap ring 98 is a filter plug 100. During operation of the engine mounting the air cleaner, a vacuum pressure gauge (not shown) may be attached to the outer end of the fitting bolt 90 to measure the pressure/vacuum level within the air cleaner 10 down stream of its filter 18. This pressure level, at any constant engine speed, decreases as the resistance to air flow through the filter increases due to the accumulation of entrained particulates on the filter and hence can be utilized to determine or gauge the cleanliness of the filter. The gauge is easily removable from the fitting to permit disposal of the air cleaner, as described below.

The several elements of the present air cleaner 10 are permanently joined. The air cleaner is designed to be disposed of when the filter 18 becomes too dirty for further use. In the case of air cleaner configuration in FIGS. 4–7, all of the parts except the air cleaner 10 are reusable.

We claim:

1. An air cleaner for an internal combustion engine having an intake air duct, comprising:
   a housing having air inlet means, air outlet means, and an air passage having an inlet end opening to the exterior of said housing through said inlet means and an outlet end opening to the exterior of said housing through said outlet means,
   an air filter within said passage through which air flow occurs from said inlet means to said outlet means, and wherein
   one of said means is adapted for connection to an engine air intake duct of a certain size, and said air cleaner includes an adapter to be removably secured to said one means for adapting said one means for connection to an engine air intake duct of a different size, whereby said air cleaner may be used on engines having different sized air intake ducts.

2. An air cleaner according to claim 1 wherein:
   said one means comprises a coupling surrounding the adjacent end of said passage and internally sized to receive an engine air intake duct of said certain size, and
   said adaptor comprises an annular reducer insertable into said coupling and having a central opening which is sized to receive an engine air intake duct of said different size.

3. An air cleaner according to claim 2 wherein: said coupling is an outlet coupling surrounding said passage outlet end.

4. An air cleaner according to claim 3 wherein:
   said coupling is a flexible, generally sleeve-like outlet coupling surrounding said passage outlet end, and said adapter is resiliently yieldable.

5. An air cleaner for an internal combustion engine having an intake air duct, comprising:

a housing having air inlet means, air outlet means, and an air passage having an inlet end opening to the exterior of said housing through said inlet means and an outlet end opening to the exterior of said housing though said outlet means, an air filter within said passage through which air flow occurs from said inlet means to said outlet means, and wherein said housing includes a wall having an inner side within the housing and an opening bounded about its circumference by said wall, said air filter has an interior air passage opening at one end to the exterior of the filter and an annular edge portion circumferentially surrounding said one end of said filter passage, said filter edge portion is situated adjacent said wall in surrounding relation to said wall opening, and one of said means comprises a unitary engine air duct coupling member including a coupling sleeve portion extending externally of said housing through said opening and having an inner end within said housing, and a bonding portion integrally joined to and extending radially outward from said inner end of said coupling sleeve portion across the inner side of said housing wall and bonded and sealed directly to said annular air filter portion about said one end of said filter passage.

6. An air cleaner according to claim 5 wherein:
the material of said coupling member is flexible.

7. An air cleaner according to claim 5 wherein:
said bonding portion is molded about said filter edge portion.

8. An air cleaner according to claim 7 wherein:
the material of said coupling member is flexible.

9. An air cleaner according to claim 5 wherein:
said housing is generally cylindrical and has opposite ends, and a side wall between said ends, said housing wall is a first housing end wall located at one of said housing ends, and said housing includes a second end wall closing the other housing end, said filter is generally cylindrical and has one end adjacent said first end wall and an opposite end adjacent said second end wall, said filter edge portion is located at and said filter passage opens through said one end of said filter, said inlet means comprises an air inlet in said side wall, said one means comprises said outlet means, and said coupling member comprises an outlet coupling member, and said coupling sleeve portion of said coupling member extends through said opening longitudinally of said housing.

10. An air cleaner for an internal combustion engine having an intake air duct, comprising:

a housing having air inlet means, air outlet means, and an air passage having an inlet end opening to the exterior of said housing through said inlet means and an outlet end opening to the exterior of said housing through said outlet means, an air filter within said passage through which air flow occurs from said inlet means to said outlet means, and wherein one of said means comprises a sleeve-like coupling portion extending externally of said housing through an opening in the housing in surrounding relation to the adjacent end of said passage for receiving said engine intake air duct, and a filter bonding portion within said housing integral with said coupling portion which bonds and seals said filter to the interior of said housing and seals said coupling portion to said housing about said opening, said housing has a closed end, an opposite end containing said opening, and a side wall, said filter extends endwise through said housing and has one end adjacent said opposite housing end, said inlet means comprises an air inlet in said side wall, said one means comprises sad outlet means, said coupling portion comprises an outlet coupling surrounding said passage outlet end and extending through said opening longitudinally of said housing, said housing and filter are generally cylindrical in cross-section, said opening is situated on the longitudinal axis of said housing, said filter bonding portion extends from said coupling portion radially outward across said opposite housing end to said housing wall about the full circumference of the wall, said filter is concentrically disposed within said housing with one end of the filter located adjacent said filter bonding portion and has a central passage opening through said one filter end to said housing opening, and said filter end is embedded in said filter bonding portion about said central filter opening, the material of said coupling and filter bonding portions is flexible, said outlet coupling is adapted to receive an engine air intake duct of a certain size, and said air cleaner includes an annular adapter to be removably inserted into said coupling and receive an engine air intake duct of a different size, whereby said air cleaner may be used on engines having different sized air intake ducts.

11. An air cleaner for installation within the engine compartment of an engine powered vehicle having a hood movable between open and closed positions relative to said compartment, an engine air intake passage within said hood having a discharge opening to the compartment in the normally underside of the hood, and an engine air intake duct within said engine compartment, said air cleaner comprising:

a housing having an air outlet for connection to said engine air intake duct and an air inlet, a filter within said housing through which air flow occurs from said inlet to said outlet, a flexible air inlet boot having inner and outer ends, an air passage opening through said ends, and a seating surface surrounding and facing axially of said outer passage end, means securing said inner boot end to said housing in fluid sealing relation to the housing about said housing air inlet and the inner end of said boot air passage with the passage opening to said inlet, and wherein said air cleaner is mountable within the engine compartment in a position wherein said filter housing outlet receives said engine air intake duct and said boot seating surface is disposed for seating and sealing engagement with the underside of said hood about said discharge opening when said hood occupies its closed position.

12. An air cleaner according to claim 11 wherein:

said housing has a cylindrical side wall,
said inlet comprises an opening in said side wall,
said inner boot end is generally saddle-shaped and has a peripheral edge which conforms in contour to the edge of said inlet opening, and
said means securing said inner boot end to said housing comprises a groove in said peripheral boot edge receiving said inlet opening edge.

13. An air cleaner according to claim 11 wherein:
said boot has accordion pleats which permit longitudinal compression of the boot when the hood closes.

14. An air cleaner according to claim 13 wherein:
said housing has a cylindrical side wall,
said inlet comprises an opening in said side wall,
said inner boot end is generally saddle-shaped and has a peripheral edge which conforms in contour to the edge of said inlet opening, and
said means securing said inner boot end to said housing comprises a groove in said peripheral boot edge receiving said inlet opening edge.

15. A disposable air cleaner for an internal combustion engine having an intake air duct, comprising:
a housing having an air inlet, an air outlet, and a passage communicating said inlet and outlet,
filter means within said passage through which air flow occurs from said inlet to said outlet,
a fitting on said housing including a passage opening to said housing passage at one side of said filter and means accessible externally of said housing for releasable connection to a pressure gauge for measuring the air pressure within said housing passage at said one side of said filter, and wherein
said air cleaner is connectable to said engine air intake duct so that engine intake air flow from said inlet, through said filter, to said outlet, the cleanliness of the filter may be monitored with the pressure gauge, and the gauge may be removed from the housing to permit disposal of the air cleaner when dirty.

16. The method of making an air cleaner for an internal combustion engine having an intake air duct, which air cleaner comprises a housing having an air passage having an inlet end through which air enters the housing and an exit end through which air exits the housing, an air filter within said housing though which air flow occurs from said inlet end to said exit end and having a portion surrounding one end of said passage, a coupling member including a coupling sleeve portion extending externally of said housing through an opening in the housing in surrounding relation to said one end of said passage for receiving said engine intake air duct, and a filter bonding portion within said housing integral with said coupling sleeve portion which bonds and seals said filter to said coupling sleeve portion about said passage, said method comprising the steps of:
placing said filter within said housing in a position wherein said portion of the filter surrounds said one end of said passage;
providing a coupling mold having a mold cavity conforming to the shape of said coupling sleeve portion,
providing a moldable fluid bonding compound which is settable to a solid state,
placing said housing and mold in contact and in positions wherein said housing opening is at the bottom of said housing and opens downwardly to said mold cavity and said housing is sealed to said mold about said opening and mold cavity,
introducing said fluid bonding compound into the lower end of the housing interior in such a way that the compound fills said mold cavity and the lower end of said housing to a level wherein said filter portion is immersed in the compound, and
effecting setting of said bonding compound to its solid state.

17. The method of claim 16 wherein:
said bonding compound is a thermoplastic bonding compound which is introduced into said housing in a molten state and cools to a resiliently flexible solid state.

18. The method of claim 17 wherein:
said bonding compound is PLASTISOL.

* * * * *